US011027730B2

(12) United States Patent
Girond

(10) Patent No.: US 11,027,730 B2
(45) Date of Patent: Jun. 8, 2021

(54) SYSTEMS AND METHODS FOR REGULATION OF AUTONOMOUS CRUISE CONTROL

(71) Applicant: TOYOTA MOTOR EUROPE, Brussels (BE)

(72) Inventor: Paul Girond, Brussels (BE)

(73) Assignee: TOYOTA MOTOR EUROPE, Brussels (BE)

(*) Notice: Subject to any disclaimer, the term of this patent is extended or adjusted under 35 U.S.C. 154(b) by 21 days.

(21) Appl. No.: 16/315,196

(22) PCT Filed: Dec. 7, 2016

(86) PCT No.: PCT/EP2016/080154
§ 371 (c)(1),
(2) Date: Jan. 4, 2019

(87) PCT Pub. No.: WO2018/103848
PCT Pub. Date: Jun. 14, 2018

(65) Prior Publication Data
US 2019/0283749 A1    Sep. 19, 2019

(51) Int. Cl.
*B60W 30/14* (2006.01)
*B60W 30/04* (2006.01)
(Continued)

(52) U.S. Cl.
CPC .......... *B60W 30/14* (2013.01); *B60W 30/143* (2013.01); *B60W 40/04* (2013.01);
(Continued)

(58) Field of Classification Search
CPC ....... B60K 2310/246; B60K 2310/248; B60W 30/14; B60W 30/143; B60W 40/04;
(Continued)

(56) References Cited

U.S. PATENT DOCUMENTS 9,056,395 B1* 6/2015 Ferguson .............. B60W 30/16
9,221,461 B2 12/2015 Ferguson et al.
(Continued)

FOREIGN PATENT DOCUMENTS

EP    2828113 A1 *  1/2015  ............ B60W 30/16
EP    3 031 686 A1   6/2016
(Continued)

OTHER PUBLICATIONS

Written Opinion of the International Searching Authority of PCT/EP2016/080154 dated Sep. 1, 2017.
(Continued)

*Primary Examiner* — Abby Y Lin
*Assistant Examiner* — Hossam M Abd El Latif
(74) *Attorney, Agent, or Firm* — Sughrue Mion, PLLC

(57) ABSTRACT

A driver assistance system for a vehicle including an autonomous cruise control to autonomously control at least vehicle speed, position data obtaining unit to obtain vehicle position data, ego-vehicle sensor data obtaining unit to obtain ego-vehicle sensor data related to objects in proximity to the vehicle, works data receiving unit to receive works data regarding current roadworks within a predetermined distance of the vehicle, and a processor to determine, based on the ego-vehicle sensor data, the works data, the position data, the vehicle's position and direction of travel relative to one or more roadworks, and when the processor determines the vehicle is approaching one or more roadworks and the vehicle distance to the roadwork is less than a threshold distance, or when the processor determines that the vehicle is already present within a roadwork and the autonomous cruise control is enabled, disable the autonomous cruise control.

14 Claims, 4 Drawing Sheets

(51) Int. Cl.
*B60W 40/04* (2006.01)
*B60W 50/14* (2020.01)
*B60W 40/06* (2012.01)
*G05D 1/00* (2006.01)
*G05D 1/02* (2020.01)
*G08G 1/0962* (2006.01)
*G08G 1/0967* (2006.01)
*H04W 4/46* (2018.01)
*H04W 4/021* (2018.01)
*G08G 1/16* (2006.01)

(52) U.S. Cl.
CPC ............ *B60W 40/06* (2013.01); *B60W 50/14* (2013.01); *G05D 1/0088* (2013.01); *G05D 1/0223* (2013.01); *G08G 1/0962* (2013.01); *G08G 1/096725* (2013.01); *G08G 1/096791* (2013.01); *G08G 1/16* (2013.01); *H04W 4/021* (2013.01); *H04W 4/46* (2018.02); *B60K 2310/246* (2013.01); *B60K 2310/248* (2013.01); *B60W 2400/00* (2013.01); *B60W 2552/00* (2020.02); *B60W 2554/00* (2020.02); *B60W 2556/50* (2020.02); *B60W 2556/60* (2020.02); *B60W 2556/65* (2020.02); *G05D 2201/0213* (2013.01)

(58) Field of Classification Search
CPC .. B60W 40/06; B60W 50/14; B60W 2552/00; G08G 1/0962; G08G 1/16; G08G 1/0088; G08G 1/0223; G08G 1/096725; G08G 1/096791; G08G 2201/0213; H04W 4/46; H04W 4/021

USPC .......................................................... 701/23
See application file for complete search history.

(56) References Cited

U.S. PATENT DOCUMENTS

| | | | | |
|---|---|---|---|---|
| 2012/0323474 | A1* | 12/2012 | Breed | B60W 30/16 701/117 |
| 2014/0005907 | A1* | 1/2014 | Bajpai | B60K 31/0008 701/96 |
| 2014/0100754 | A1 | 4/2014 | Schwindt | |
| 2014/0210644 | A1* | 7/2014 | Breed | G01S 19/17 340/905 |
| 2016/0176403 | A1 | 6/2016 | Weston | |
| 2016/0334233 | A1* | 11/2016 | Baverstock | B60W 30/16 |

FOREIGN PATENT DOCUMENTS

| | | | | |
|---|---|---|---|---|
| EP | 3031686 A1 * | 6/2016 | ............ | B60W 30/00 |
| GB | 2 402 502 A | 12/2004 | | |
| JP | 2014-67165 A | 4/2014 | | |

OTHER PUBLICATIONS

International Search Report of PCT/EP2016/080154 dated Sep. 1, 2017.

\* cited by examiner

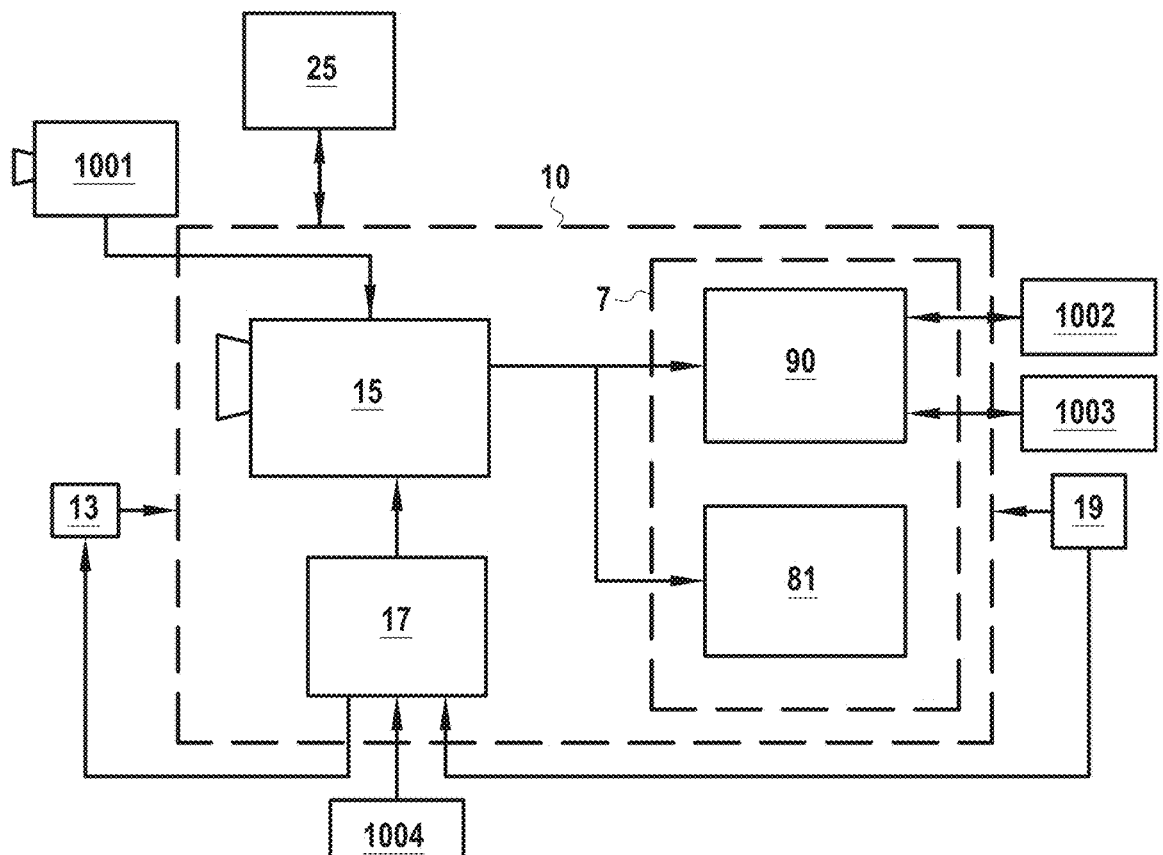
FIG.1
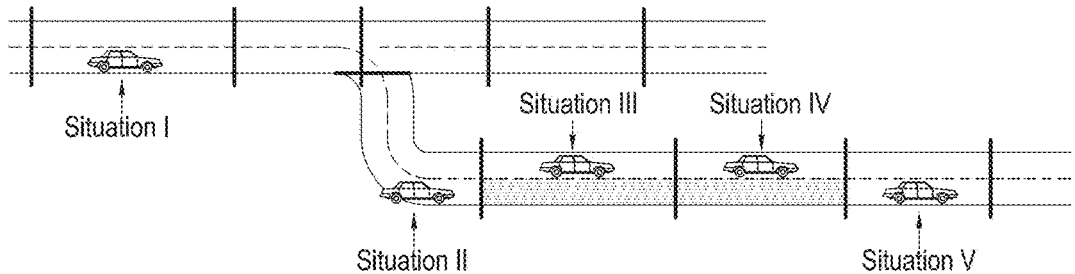
FIG.3A
FIG.3B

SYSTEMS AND METHODS FOR REGULATION OF AUTONOMOUS CRUISE CONTROL

CROSS REFERENCE TO RELATED APPLICATIONS

This application is a National Stage of International Application No. PCT/EP2016/080154 filed Dec. 7, 2016.

FIELD OF THE DISCLOSURE

The present disclosure is related to systems and methods for driver assistance, and more particularly, to assisting a driver with regulation of an autonomous cruise control based on the presence of a construction zone.

BACKGROUND OF THE DISCLOSURE

Autonomous cruise control (ACC) for vehicles has been available as a vehicle control option for a number of years. Using such systems a driver may set a desired speed for the vehicle, and allow the vehicle to automatically adjust this speed to maintain a safe distance from vehicles ahead of the driver's vehicle.

Additional control strategies have also been implemented taking into account the presence of ACC. For example, when a vehicle control system has been alerted that an accident has occurred ahead of a vehicle, the ACC may cause the vehicle to begin slowing to reduce the risk of a follow-on collision.

Particularly vulnerable areas are roadworks, particularly for accidents and for the workers operating in the roadwork. Typically, as a vehicle approaches a roadwork, traffic signs indicate such an approach in a variety of ways. For example, lane lines may change from white to yellow, speed limit signs may indicate a gradual or more abrupt reduction in speed limit, and warning signs may indicate an impending entrance to a roadwork. Once inside the roadwork, similar signs may be present, in addition to signs more particularly indicating the vehicles presence within the roadwork.

Roadwork recognition may be accomplished by using suitable devices (e.g., optical devices such as a camera) for perceiving or detecting the surroundings of a motor vehicle as well as data services provided by, for example, wireless communications. Systems are available commercially, for example, both from automobile manufacturers, and from manufacturers of portable navigation devices (PNDs). The PND systems are based on GPS signals and map data for supplying the driver with information relating to roadworks stored locally or remotely. However, such information can become quickly outdated, and virtually worthless in the case of temporary and/or mobile roadworks (e.g., grass mowing).

Some existing systems implement a camera device for improving recognition accuracy and robustness. Manufacturers of vehicles sometimes use front-mounted camera devices and means for combining signals with data relating to the driving state of the vehicle. A further option is means for combining signals with navigation devices.

Various systems exist for providing assistance to drivers of motor vehicles within a roadwork, particularly with regard to manipulation of autonomous cruise control functions. For example, U.S. Pat. No. 9,221,461 discloses systems and methods for detection of a construction zone using information from a plurality of sources. The computing device may be configured to modify a control strategy associated with a driving behavior of the vehicle, based on the likelihood, and control the vehicle based on the modified control strategy.

JP 2014-067165 discloses that a vehicle receives construction information transmitted over inter-vehicle communication from a construction vehicle. If a travel speed of the vehicle passing through a roadwork has been set by an ACC, an ACC set speed control part performs driving support to change the set travel speed of the vehicle to a speed indicated by control vehicle speed information in the received construction information. When a lane departure prevention device is in operation in the vehicle, driving support is performed to change a correction travel trajectory according to a positional relation of a construction area with respect to a lane where the vehicle is traveling, or to change a departure determination threshold to a value for achieving higher-response control. The vehicle is notified about changes in speed by the ACC set speed control part and changes in the correction travel trajectory and the departure determination threshold by a lane departure control part.

SUMMARY OF THE DISCLOSURE

Configurations described above generally lack desirable control for confirming the validity of a detected sign, particularly when a zone condition exists. As used herein a zone condition shall refer to an area within which a particular set of traffic rules applies throughout the area. In other words, and as an example, a speed limit indicated at the entry of a zone area applies to all roads throughout the zone area demarcated by the location of a zone indicator and an end-of-zone indicator.

Further, the term "autonomous cruise control" shall be understood to be synonymous with "adaptive cruise control" and shall further be understood to include all cruise control functions (e.g., acceleration, braking, etc.)

According to embodiments of the present disclosure, a driver assistance system for a vehicle, including an autonomous cruise control configured to autonomously control at least a vehicle speed, position data obtaining means configured to obtain position data indicative of the vehicle's position, ego-vehicle sensor data obtaining means configured to obtain ego-vehicle sensor data related to objects in proximity to the vehicle, works data receiving means configured to receive works data regarding current roadworks within a predetermined distance of the vehicle, and processing means. The processing means is configured to determine, based on the ego-vehicle sensor data, the works data, and the position data, the vehicle's position and direction of travel relative to one or more roadworks and when the processing means determines that the vehicle is approaching a roadwork of the one or more roadworks and that the vehicle distance to the roadwork is less than a threshold distance, or when the processing means determines that the vehicle is already present within a roadwork and the autonomous cruise control is enabled, disable the autonomous cruise control.

Ego-vehicle sensors data may include, for example, camera data (e.g., image data) and/or multiple data formats from several ego-vehicle sensors (e.g. camera+radar/lidar).

Because the ACC may be automatically disabled by the ECU, it becomes possible to alleviate driver load (and strain) while improving safety for both for vulnerable individuals (e.g., construction workers) and occupants of the vehicle. Further, because the autonomous cruise control may continue to be used when a vehicle is not approaching a roadwork, driver comfort can be improved.

In addition, because ego-vehicle sensor data is cross-referenced with navigational points of interest, it becomes possible to enhance safety with regard to both temporary/mobile roadworks and stationary scheduled roadworks.

When the vehicle distance to the roadwork is greater than the threshold value or the vehicle is determined to be not approaching the roadwork based on the direction of travel relative to the roadwork, the processing means may be configured to maintain functions of the autonomous cruise control.

The processing means may be configured to determine, based on the ego-vehicle sensor data, the works data, and the position data, when the vehicle is exiting the roadwork.

When the processor determines that the vehicle is exiting the roadwork, the processor is configured to re-enable the autonomous cruise control. This can further alleviate driver load and strain.

The processor may be configured to provide a warning before disabling of the autonomous cruise control and/or before re-enabling the autonomous cruise control, the warning comprising at least one of an audible warning and a visual warning.

Disabling and/or re-enabling of the autonomous cruise control may be performed gradually over a predetermined time period. This may further increase driver comfort and confidence in the system by eliminating a sudden stop in functions associated with an ACC.

The driver assistance system may further include a works data transmitting means configured to transmit data related to a location of a suspected roadwork.

When the processing means determines the presence of a suspected roadwork based on the ego-vehicle sensor data but not indicated by the works data, the processing means may be configured to cause the works data transmitting means to transmit the vehicle position and an indication of the suspected roadwork to a remote receiver.

When the processing means determines the presence of a suspected roadwork based on the ego-vehicle sensor data but not indicated by the works data, the processing means may be configured to disable the autonomous cruise control until the processing means determines an end of the suspected roadwork based on the ego-vehicle sensor data.

When the processing means determines the presence of a roadwork based on works data provided by the works data receiver, but not indicated by ego-vehicle sensor data obtaining means, the processing means may be configured to disregard the ego-vehicle sensor data, based on various criteria, such as works data freshness, for example.

According to further embodiments of the present disclosure, a method for driver assistance is provided. The method includes obtaining position data indicative of the vehicle's position, obtaining ego-vehicle sensor data of objects in proximity to the vehicle, receiving works data regarding current roadworks in proximity to the vehicle, determining, based on the ego-vehicle sensor data, the works data, and the position data, the vehicle's position and direction of travel relative to one or more roadworks, and when the vehicle is approaching a roadwork of the one or more roadworks and the vehicle proximity to the roadwork is less than a threshold distance, or when the vehicle is already present within one of the one or more roadworks and the autonomous cruise control is enabled, disabling the autonomous cruise control.

When the vehicle proximity to the roadwork is greater than the threshold value or the vehicle is determined as not approaching the roadwork based on the direction of travel relative to the roadwork, maintaining the autonomous cruise control.

The method for driver assistance further including, determining, based on the ego-vehicle sensor data, the works data, and the position data, when the vehicle is exiting the roadwork.

The method for driver assistance further including, when the vehicle is exiting the roadwork, re-enabling the autonomous cruise control.

The method for driver assistance further including providing a warning before disabling of the autonomous cruise control and/or before re-enabling the autonomous cruise control, the warning comprising at least one of an audible warning and a visual warning.

Disabling of the autonomous cruise control may be performed gradually over a predetermined time period.

The method for driver assistance further including, determining, based solely on the ego-vehicle sensor data, a suspected roadwork, and transmitting the vehicle position and an indication of the suspected roadwork to a remote receiver.

The method for driver assistance according to claim 16, comprising, when the vehicle is approaching or within the suspected roadwork, disabling the autonomous cruise control until an end of the suspected roadwork has been determined.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 1 shows an exemplary driver assistance system according to embodiments of the present disclosure;

FIG. 3A is an exemplary situational chart for consideration of exemplary logic applied at FIG. 3B;

FIG. 3B is a table showing exemplary values of a roadwork_flag based on various situations of a vehicle;

DESCRIPTION OF THE EMBODIMENTS

Figure 2:
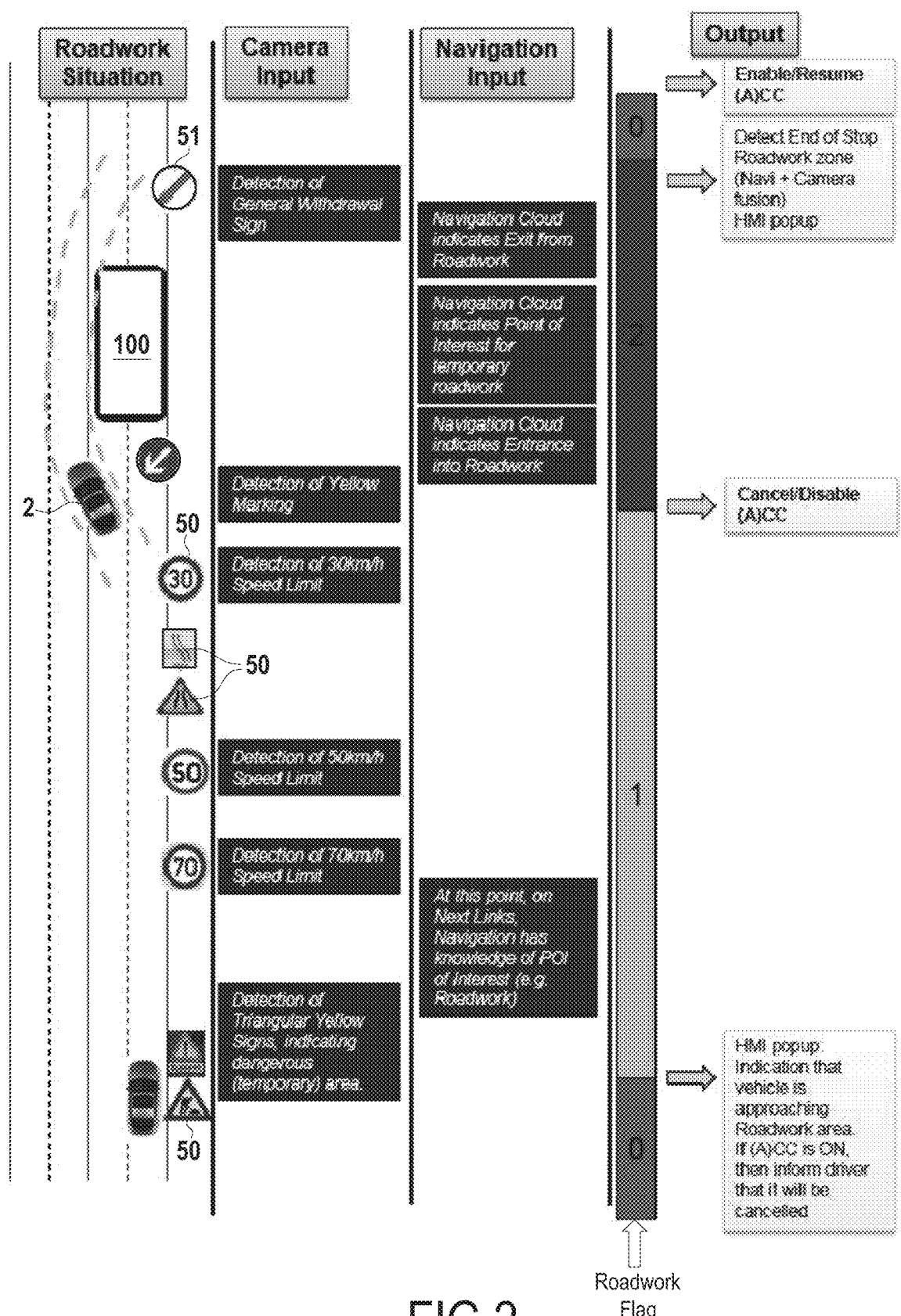
FIG. 2 is an exemplary schematic representation of indicators in phases leading up to, through, and out of an exemplary roadwork, and associated states of the system during these phases.

Reference will now be made in detail to exemplary embodiments of the disclosure, examples of which are illustrated in the accompanying drawings. Wherever possible, the same reference numbers will be used throughout the drawings to refer to the same or like parts.

In the following description, a "roadwork_flag" will be referred to with regard to certain determinations and effects on control of the vehicle, and more particularly with regard to control of an autonomous cruise control. For reference purposes, it shall be understood that when roadwork flag=0, ECU 10 is instructed that no roadwork 100 is in proximity to the vehicle. When roadwork flag=1, ECU 10 is instructed that the vehicle is approaching a roadwork 100, and when roadwork flag=2, ECU 10 is instructed that the vehicle is currently within a roadwork zone 100. One of skill will understand that any collection of values may be used for roadwork_flag, and values 0, 1 and 2 are exemplary only.

FIG. 1 shows an exemplary driver assistance system 1 according to embodiments of the present disclosure. The driver assistance system 1 may include an autonomous cruise control (ACC) 7, an ECU 10, ego-vehicle sensors 1001, ego-vehicle sensor data module(s) 15, position data module 17, position capture device 1004, works data receiver 19, works data transmitter 13, and a display 25, among others.

ACC 7 may be configured to control a speed associated with the vehicle based on an operator's desired speed, while maintaining a predetermined distance between preceding vehicles, among others. To perform such control, ACC 7 may be configured to, e.g., operate a vehicle braking system, perform engine braking, coasting, regenerative braking, and/or other suitable techniques for reducing or maintaining vehicle speed, and e.g., control a vehicle fuel system, electrical system, etc., to accelerate or maintain vehicle speed.

For example, ACC 7 may include an EFI ECU 1002 linked to a vehicle speed control module 90 and the vehicle throttle (not shown), a USC ECU 1003 linked to the vehicle braking system (not shown) and the vehicle speed control module 90, and a display control ECU 81, each of the these ECUs communicating with ECU 10. EFI ECU 1002 may be configured to control a fuel amount delivered to engine based on information received from vehicle speed control module 90 so as to control engine rotational speed, while VSC ECU 1003 may be configured to control vehicle braking based on information received from vehicle speed control module 90. Display control ECU 81 may be configured to receive driver input such as actuation of an ACC on/off lever, and to provide output to the driver via visual or audible cues. Display control ECU 81 may be configured to interface between various components of ACC 7 and ECU 10 in order to receive and carry out ACC instructions.

One of skill will understand that operations of an ACC with regard to controlling a vehicle speed are generally known, and further explanation thereof shall not be undertaken here.

ECU 10 may include any suitable device configured to manipulate data, perform calculations, execute code for decision making, causing information to be brought to the attention of an operator of vehicle 2, in order to carry out embodiments of the present disclosure. For example, as will be discussed below, ECU 10 may be configured to set a value of a roadwork_flag applying logic to information received from ego-vehicle sensor data module 15, works data receiver 19, and position data module 17. In addition, ECU 10 may provide a variety of functions related to operations of various other components of the presently described system, e.g., ACC 7. For example, ECU 10 may include various analog and/or digital circuits, and may include integrated circuits such as RISC processors, i386 processors, ASIC processors, etc. Typically, on-board computers in modern vehicles include such processors, and one of skill will understand that the present ECU 10 may be comprised by such an on-board computer, or may be separately provided and ECU 10 may provide a variety of functions related to operations of various other components of the presently described system, such as, for example, functions associated with ACC 7, position data module 17, works data receiver 19, etc. One of skill in the art will also understand that the exemplary circuits and processors described herein are not intended to be limiting, and that any suitable device may be implemented.

ECU 10 may be linked to one or more databases and/or other memory (e.g., RAM, ROM, etc.) associated with vehicle 2 so as to enable storage of vehicle related data as well as values that may be utilized during processing of vehicle functions (e.g., threshold values), such as recognized indicator validation based on ego-vehicle sensor data received from ego-vehicle sensor data module 15. One of skill in the art will recognize that information discussed herein with regard to any such databases and/or memory is not intended to be limiting.

ECU 10 may be configured to receive data from ego-vehicle sensor data module 15, position data obtaining means 17, works data receiver 19, other vehicle systems (e.g., speed sensors), and external sources (e.g., terrestrial and satellite radio communications). For example ECU 10 may receive a stream of ego-vehicle sensor data related to objects in proximity to the vehicle from ego-vehicle sensor data module 15, OPS data related to the vehicle position from position data module 17, and Cloud based roadworks data from works data receiver 19, etc.

ECU 10 may therefore include one or more means for receiving the data from ego-vehicle sensor data obtaining means 15, position data capture device 17, and works data receiver 19. For example ECU 10 may be linked to one or more interfaces, e.g. network interfaces, which may be configured to receive wirelessly and/or by wire such data, among others (e.g., USB, Bluetooth™, Firewire™, ANT+, etc.)

Ego-vehicle sensor data obtaining means 15 may include, for example, one or more cameras and/or other suitable devices (e.g., lidar, radar, etc.) configured to obtain optical data (e.g., image data) from an area surrounding a vehicle (e.g., in front of a forward moving vehicle). Ego-vehicle sensor data module 15 may be configured to process the data obtained from the surroundings of the vehicle (e.g. received from ego-vehicle sensors 1001) to determine the existence of indicators 50 or 51 (e.g., road signs such as a speed limit signs, roadwork related signs, lane lines, traffic cones, all-clear signs, among others). Ego-vehicle sensors 1001 are known in the art, and one of skill in the art will understand that any such ego-vehicle sensors 1001 may be implemented in the present system without departing from the scope of the present disclosure.

Ego-vehicle sensors 1001 may be located on a vehicle 2 so as to provide a desirable field of view of the surroundings of the vehicle 2 (e.g. a front and side view spanning approximately 180 degrees). For example, ego-vehicle sensors 1001 may be located at one or more locations behind the windshield, on a front bumper, a side view mirror, rearview mirror, or other suitable mounting location on the vehicle 2 so as to provide a field of view of approaching indicators 50 (e.g., lane lines, traffic signs, flag men, etc).

According to some embodiments it may be desirable to minimize visibility of ego-vehicle sensors 1001 for aesthetic reasons, and one of skill in the art will understand that finding a mounting location suitable to achieve this goal while also providing desirable field of view surrounding the vehicle 2 to be a reasonable consideration. The term "desirable" when referring to field of view as used herein shall mean a field of view providing ego-vehicle sensors 1001 with the ability to identify indicators 50 and 51 present on the road surrounding the moving vehicle and to display information related to said indicators to a driver of the vehicle on display 25 and/or to ECU 10 with a success rate for identification of at least 99 percent.

Ego-vehicle sensors 1001 may be configured to provide the data regarding indicators 50 and 51 surrounding the vehicle 2 to ego-vehicle sensor data module 15 and in turn to ECU 10. Such data may include, for example, a speed limit indicator, a construction zone sign, one or more lane lines and associated color thereof (e.g., white, yellow, blue), presence of a construction vehicle and/or vehicle indicating a roadwork ahead, exiting of roadworks, general all-clear signs, etc. Such indicators may be temporary, mobile, and/or stationary type indicators. An example of a mobile indicator is a construction sign mounted on a moving construction vehicle.

Ego-vehicle sensor data module 15 may provide such data to ECU 10 via a wired connection, a wireless connection, or other suitable method for transferring data to ECU 10. For example, ego-vehicle sensor data module 15 may include wireless communication means (e.g. IEEE 802.11 compliant Wi-Fi hardware) for transmitting data to ECU 10 and/or other devices that may use the data from ego-vehicle sensor data module 15. Alternatively or in addition, for example for safety purposes, a wired connection (e.g., USB) may be provided. Such a wired connection may be provided, for example, to provide failsafe where a wireless connection could cease to function.

When obtaining data related to an indicator 50, ego-vehicle sensor data module 15 may be configured to assign a time indicator (e.g., a timestamp) to the ego-vehicle sensor data received from ego-vehicle sensors 1001. Alternatively, ECU 10 may be configured to assign a time indicator and/or location indicator to the ego-vehicle sensor data upon receipt from ego-vehicle sensor data module 15. By assigning a time indicator to data obtained from ego-vehicle sensors 1001, an age of the data (i.e., time/distance elapsed since an indicator was identified by ego-vehicle sensor data module 15) may be tracked by ECU 10, among others.

Ego-vehicle sensor data module 15 may include, among others, a database containing information related to indicators 50 and 51, for comparison with obtained ego-vehicle sensor data in order to determine what type of indicator 50 has been detected. For example, speed limit signs, men-at-work signs, moving vehicles with warning indicators, signs having a yellow background, lane line color changes and/or width changes, general all-clear signs, etc, may be stored in the database to enable ego-vehicle sensor data module 15 to determine what type of indicator 50 and 51 has been detected. In addition, information related to roadwork exit signs/end-of-roadwork signs 51, for example, may also be stored in the database, enabling determination that a vehicle has reached the end of a particular roadwork and may revert back to normal highway rules.

Alternatively or in addition to the database stored in ego-vehicle sensor data module 15, ECU 10 may include ego-vehicle sensor data and may perform the comparison based on ego-vehicle sensor data provided by ego-vehicle sensors 1001. One of skill in the art will understand that the present disclosure will not detail techniques for such comparisons (e.g., image comparison, radar profile comparison, etc.), as such comparisons are known in the art.

Position data module 17 may be configured to obtain position data indicative of the vehicles position from position capture device 1004. For example, position capture device 1004 may comprise a GPS receiver configured to provide coordinate data indicating a current position of the vehicle at any particular time as well as a direction and speed of travel. Alternatively, or in addition, position capture device 1004 may comprise wireless data receivers (e.g., cell based, WiFi based, etc) enabling position determination via triangulation, for example. Any such configurations are intended to be included within the scope of the present disclosure.

Position capture device 1004 may be configured to provide coordinate data indicative of a vehicles position to position data module 17, and in turn to ECU 10 via wireless and/or wired communication. In addition, position data module 17 may further be configured to provide stored map based location information, including, but not limited to, points of interest, construction zones, future planned construction zones, etc. Therefore, position data module 17 may be configured to be updated on a predetermined basis (e.g., each time the vehicle is started), either automatically or manually. For example, position data module 17 may be configured to receive automatic over-the-air updates with current information related to construction zones, points of interest, speed limits, etc. Alternatively, or in addition, the vehicle 2 may prompt a driver to connect the vehicle 2 to the Internet via a cable (e.g., a network cable) so that updates may be carried out by wire.

Works data receiver 19 may be configured to receive works data from a remote roadwork data server (not shown) regarding current roadworks 100 within a predetermined distance of the vehicle's position. For example, works data receiver may be configured to receive data over one or more of 3G/4G, C2C (e.g., DSRC), or any other suitable communication protocol. Such data may include, for example, location coordinates of the roadwork 100, size of the roadwork zone (e.g., length, number of lanes, etc.), anticipated begin and end dates for the roadwork, etc. One example of a roadwork server can be found at http://www.roadworks.org maintained by Elgin.

Figure 5:
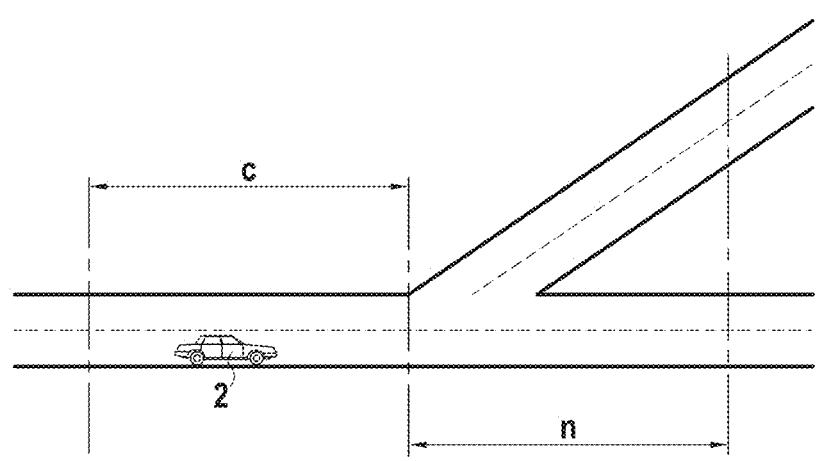
FIG. 5 is a schematic drawing showing a current link road segment and a next link(s) road segment for which roadworks data may be available.

As shown at FIG. 5, works data may be broken into portions of a Current Link C (e.g., the portion of road, for example 500 m, upon which vehicle 2 is currently traveling) and Next Links N (e.g., the portions of road over which the vehicle could be travelling over a forthcoming distance, i.e., any possible intersection/road segment outside of the 500m Current Link information).

According to some embodiments, works data receiver 19 may obtain position data (e.g., coordinates) from position data module 17 and transmit the position data to a server (e.g., a cloud based roadwork server) via a wireless data protocol (e.g., GSM, CDMA, etc). The server may then utilize this information in order to transmit a list of current roadwork zones within a predetermined distance (e.g., 10 km) of the vehicle's communicated position to works data receiver 19. This data may be further parsed into roadworks on the Current Link C, and roadworks on the Next Links N portions of road. Alternatively, and for example, depending on available bandwidth, the roadwork server may provide data regarding all current roadworks 100 on a country, county, or city basis, for example.

Works data receiver 19 may also be coupled with a works data transmitter 13. For example, works data transmitter 13 may be configured to, upon a determination by ECU 10 of a suspected roadwork 100 not present in the roadwork data received by works data receiver 19 (e.g., identified via ego-vehicle sensor data alone), to transmit the location of the suspected roadwork 100 to the works server (not shown). Such transmission may act as a crowd-sourced update to the works server. Where a large number of vehicles report the roadwork 100, the works server may confirm the presence thereof and add the roadwork 100 to the list to be provided to other vehicles entering proximity to the roadwork 100.

Works data transmitted to the roadwork server may include, for example, position data (e.g., obtained from the position data module 17), ego-vehicle sensor data related to the indicator 50 identified by ego-vehicle sensors 1001, length of the roadwork (e.g., based on distance information stored by ECU 10), lanes blocked by the roadwork, etc. One of skill will recognize that other data considered desirable in relation to the roadwork 100 may also be transmitted without departing from the scope of the present disclosure.

Display 25 may be configured to display information provided by ECU 10 to a driver of vehicle 2, for example, a popup window indicating that the vehicle is approaching a construction zone and the ACC 7 will be disabled or re-enabled.

Display 25 may be any suitable device for providing visible and/or audible information to a driver of vehicle 2. For example, display 25 may include a heads up display (e.g., on a windshield in front of a driver), a monitor, an in-dash display, and may include speakers and/or link to car stereo (e.g., via Bluetooth), etc.

Based on the ego-vehicle sensor data, the works data, and the position data, ECU 10 may calculate the vehicles position and direction of travel relative to one or more of any detected roadworks 100 (e.g., image detected and/or returned by a cloud based roadworks server), and a value of roadwork_flag may be set. ECU 10 may then act according to the current setting of roadwork_flag.

The following is an exemplary indication of actions that may be taken with regard to ACC 7 by ECU 10 based on a current set value of roadwork_flag. For example, when roadwork_flag equals 0, ECU 10 may take no action with regard to ACC 7 and ACC 7 may continue to function as before, or where not previously functioning, remain ready to be activated.

When roadwork_flag changes from 0 to 1 and ACC 7 functions are currently in operation (e.g., speed control, distance control, etc.), then ECU 10 may cause display 25 to show a popup window to indicate that the vehicle is approaching roadwork area and that the ACC functions will be cancelled. ECU 10 may cause this popup to be displayed for a predetermined time (e.g. 2 seconds). However, if ACC functions are not in operation, then ECU 10 may cause ACC functions to be deactivated such that a driver may not activate ACC 7 while roadwork_flag is 1.

When roadwork_flag changes from 0 to 2, if ACC functions are currently in operation, then ECU 10 may cause display 25 to show a popup to indicate that the vehicle is currently within a roadwork area and that ACC functions will not be available for the duration of the roadwork. Display 25 may show such a popup for a predetermined time, for example, 2 to 10 seconds, then ECU 10 may cancel the ACC functions. If ACC functions are not in operation, then ECU 10 may, similarly to the above case of roadwork_flag equal to 1, cause ACC functions to be deactivated such that a driver may not activate ACC 7 while roadwork_flag is equal to 2. A warning may optionally be displayed and/or maintained on display 25.

During a time when roadwork_flag is equal to 1 or 2, if a vehicle operator attempts to activate ACC functions, then ECU 10 may cause display 25 to show a popup indicating that ACC functions are not available because the vehicle is approaching/inside roadwork area.

When roadwork_flag changes from 1 or 2 back to 0, i.e., the vehicle exits the roadwork area (e.g., determined when a roadwork exit indicator 51 or general all-clear indicator 51 is indicated by ego-vehicle sensor data module 15) and ACC functions were not in operation when roadwork_flag changed to 1 or 2, then ECU 10 may take no action. If ACC functions were in operation when roadwork_flag changed from 0 to 1 or 2, then ECU 10 may cause display 25 to show a popup to indicate that ACC functions are now enabled and propose that ACC functions be resumed at the previously set speed or at a new speed limit regulation. Alternatively ECU 10 may cause ACC 7 to gradually resume the ACC functions that were in effect prior to the change of roadwork flag from 0 to 1 or 2, for example, over a predetermined period of time (e.g., 30 seconds).

Figure 4:
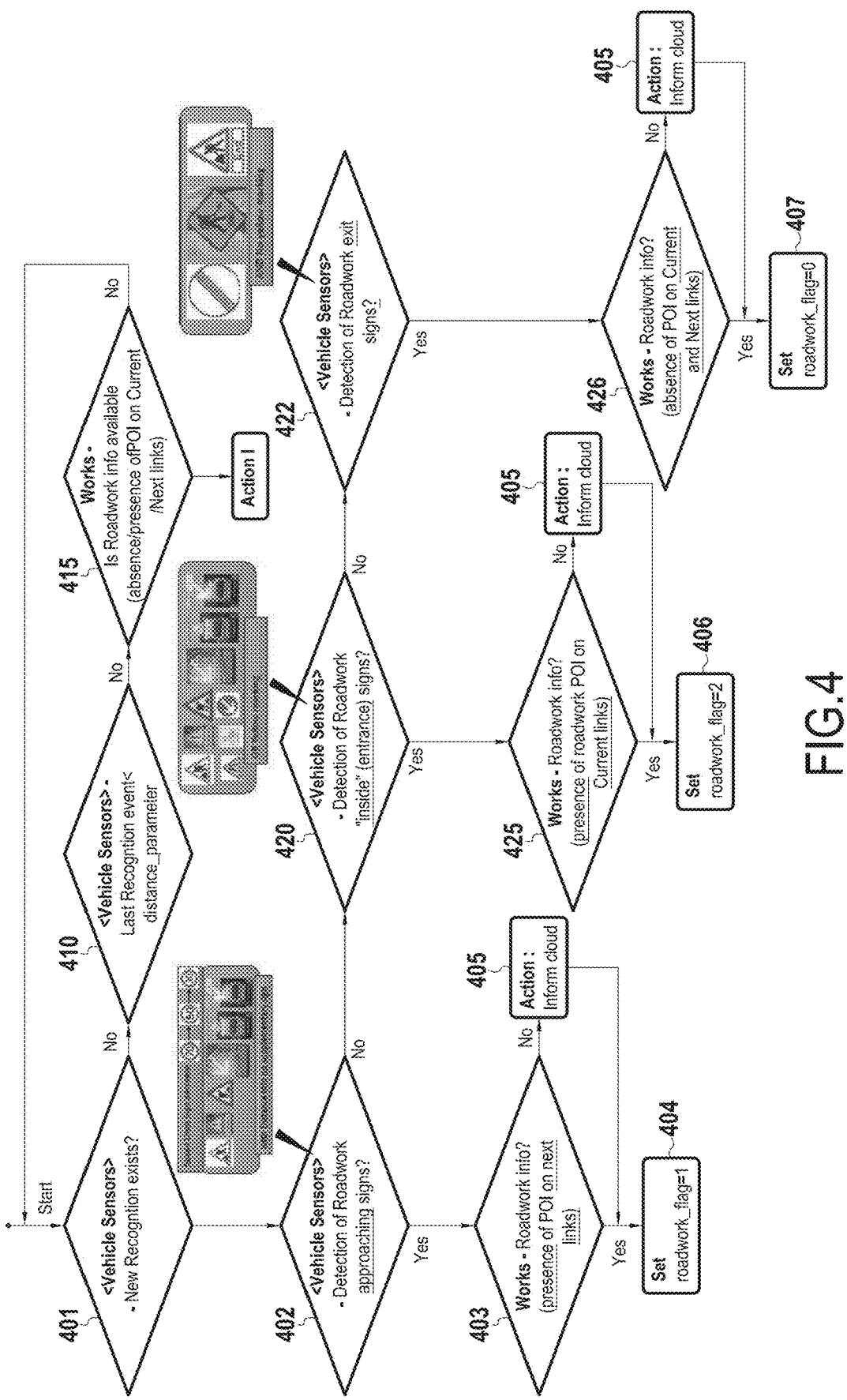
FIG. 4 is a flowchart showing an exemplary method for assisting a driver in view of a roadwork.

FIG. 4 is a flowchart depicting an exemplary processing routine for determining a setting of roadwork_flag in exemplary scenarios. The following process may run continuously while the vehicle is in motion for example as shown in FIG. 2 driving an a roadway. Ego-vehicle sensor data module 15 may actively obtain ego-vehicle sensor data associated with surroundings of the vehicle, for example speed limit signs, lane lines, roadwork signs, roadwork exit signs, and other various indicators 50 and 51. Each time a new indicator is obtained by ego-vehicle sensors 1001 (step 401) the process proceeds according to the identification as shown.

During a time when no indicator has been identified (step 401: no) ECU 10 may check to determine whether a distance parameter corresponding to the distance traveled by the vehicle since the previous indicator recognition event, for example, is less than a predetermined distance (step 410). Where the distance traveled by vehicle is less than the predetermined distance (e.g., 200$m$) (step 410: yes) ECU 10 returns to a loop to await the new recognition event or a time when the distance parameter exceeds the predetermined distance.

Where ego-vehicle sensor data module 15 recognizes a new indicator 50 or 51 (step 401: yes) this new indicator may be evaluated by ego-vehicle sensor data module 15 to determine whether the new indicator indicates a roadwork approaching (step 402). For example, ego-vehicle sensors 1001 may capture an image (e.g., radar image, optical image, etc.) of a moving construction vehicle with warning lights, yellow lane lines, men-at-work signs, etc. and provide this data to ego-vehicle sensor data module 15 for comparison to ego-vehicle sensor data stored in a database to determine whether the captured indicator corresponds to a known roadwork indicator.

If the captured indicator corresponds to a known roadwork indicator (step 402: yes) then ECU 10 may request information from works data receiver 19 to determine whether the presence of roadwork has been stored on the roadwork server (step 403), For example, ECU 10 may obtain position data of the vehicle from position data capture device and may compare the position data with known roadwork position data provided by works data receiver 19. Where the position data of the vehicle 2 and the position data of a roadwork 100 correspond within a predetermined distance, ECU 10 may determine that the vehicle is approaching the roadwork (step 403: yes) and the roadwork flag may be set equal to 1 (step 404).

Where works data received from works data receiver 19 does not indicate the presence of roadwork (step 403: no) within a predetermined distance of the vehicle's position, but the ego-vehicle sensor data continues to indicate an approaching roadwork, ECU 10 may notify the roadwork server that a suspect roadwork has been identified based on ego-vehicle sensor data provided by ego-vehicle sensor data module 15 (step 405). This notification may include position information related to the roadwork indicator 50 identified by ego-vehicle sensor data module 15 and the type of roadwork indicator 50, for example. The notification may be transmitted by ECU 10 may then proceed to determine that the vehicle is approaching a roadwork 100 based solely on the ego-vehicle sensor data captured by ego-vehicle sensors 1001, and the roadwork flag may be set equal to 1 (step 404).

Where ego-vehicle data capture device 15 has not detected indicators 50 indicative of approaching roadworks (step 402: no), but has identified an indicator 50 as potentially of the construction zone indicating type, it may undertake determination of whether the indicator 50 that has been identified shows that the vehicle is already inside the roadworks (e.g. where no prior warning of the roadwork was provided) (step 420), Similarly to the above scenario where the roadwork approaching indicator has been identified, ECU 10 may request information from works data receiver 19 to determine whether the presence of roadwork at the vehicles current position, has been stored on the roadwork server (step 425). For example, ECU 10 may obtain position data of the vehicle 2 from position data module 17 and may compare the position data with known roadwork position data provided by works data receiver 19. Where the position data of the vehicle and the position data of a roadwork correspond to a known roadwork (step 425: yes) ECU 10 may set the roadwork_flag equal to 2.

As in the previous situation, where roadwork data has not been recorded at roadwork server for the presently suspect roadwork (step 425: no), roadwork server may be notified and provided with data related to the suspect roadwork (step 405) such that other vehicles may be informed of the presence of the roadwork. Notably, using information from other vehicles in a crowdsourced type manner, presence of such a suspect roadwork may ultimately be confirmed by ego-vehicle sensor data supplied by such other vehicles.

When a predetermined distance (e.g., 200 m) has elapsed since a previous indicator recognition event, a previous indicator recognition event corresponding to where ego-vehicle sensor data module 15 has identified a new indicator 50 or 51 in proximity to the vehicle, (step 410: no), ECU 10 may request roadworks information from works receiver 19 in order to determine whether server-based roadworks data indicates one or more roadworks in proximity to the vehicle's current location. Position data of the vehicle 2 may then be compared with any works data received by ECU 10 in order to determine whether a roadwork may be approaching despite the lack of indication from ego-vehicle sensor data module 15 (step 415). Where works data received does not indicate the presence of a roadwork in proximity to the vehicle (step 415: no), ECU 10 returns to the loop in which ego-vehicle sensor data module 15 continues to await an indicator identification or exceeded distance.

When, in the absence of ego-vehicle sensor data indicating a roadwork, works data received from works data receiver 19 indicates the presence of a roadwork (step 415: yes), roadwork_flag may be set according to the table shown at FIG. 3B.

FIGS. 3A and 3B are a situational chart showing possible roadwork flag settings based on Navigation Point of Interest (POI) Information present on Current Link C and/or Next Links N (see FIG. 5), for example and a vehicle position with regard to roadworks 100 present only in cloud/server based data. One of skill will recognize that other groupings of construction zone POI data may be implemented without departing from the scope of the present disclosure.

As noted above, when ego-vehicle sensor data module 15 has not indicated the presence of roadworks, but works data receiver 19 indicates that the vehicle is within a predetermined distance (e.g., within 1 km) of one or more roadworks, logic may be performed based on the current status of the roadwork_flag and the roadwork server(s) containing the roadwork indicator. Several examples from the chart at FIG. 3B will now be explained.

In one example, where a first roadwork server indicates no roadwork on the Current Link C, but Next Links N includes road work within a predetermined distance, it may be evaluated based on the vehicle's position and direction of travel whether the vehicle is approaching the roadwork (Situation II in FIG. 3A), If the vehicle is approaching the roadwork in this situation, roadwork flag may be set equal to 1, regardless of the current state of roadwork_flag. This may be true in order to maximize safety of the system over driver comfort.

In a second example, where the Current Link C and Next Links N both include a roadwork, and the vehicles position indicates that the vehicle is approaching the indicated roadwork (Situation III of FIG. 3A), the roadwork flag may be set to 1.

In yet another example, where only Current Link includes a roadwork in proximity to the vehicle, and the vehicle's position indicates that the vehicle is within the indicated roadwork (Situation IV of FIG. 3A), the roadwork flag may be set to 2.

Returning to the flowchart of FIG. 4, where ego-vehicle sensor data obtaining means 15 has detected roadwork exit signs 51 (step 422: yes) and works data received from works data receiver 19 indicates that the vehicle is exiting the roadwork (step 426: yes) ECU 10 may set roadwork_flag equal to 0 (step 407). Similarly to above, if works data receiver 19 has not provided data indicating an exit from the roadwork (step 426: no) then works transmitter 13 may be caused to transmit the roadwork exit information to the roadwork server (step 405). The roadwork_flag may then be set to 0 (step 407).

One of skill in the art will recognize that additional variations may be provided without departing from the scope of the present disclosure.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A driver assistance system for a vehicle, comprising:
an autonomous cruise control configured to autonomously control at least a vehicle speed;
position data obtaining module configured to obtain position data indicative of the vehicle's position;
ego-vehicle sensor data obtaining device configured to obtain ego-vehicle sensor data related to objects in proximity to the vehicle;
works data receiver configured to receive works data regarding current roadworks within a predetermined distance of the vehicle; and
a processor configured to:
determine, based on the ego-vehicle sensor data, the works data, and the position data, the vehicle's position and direction of travel relative to one or more roadworks; and
when the processor determines that the vehicle is approaching a roadwork of the one or more roadworks and that the vehicle distance to the roadwork is less than a threshold distance, or when the processor determines that the vehicle is already present within a roadwork and the autonomous cruise control is enabled, disable the autonomous cruise control; and
the processor configured to:
determine, based on the ego-vehicle sensor data, the works data, and the position data, when the vehicle is exiting the roadwork; and
when the processor determines that the vehicle is exiting the roadwork, the processor is configured to re-enable the autonomous cruise control.

2. The driver assistance system according to claim 1, wherein when the vehicle distance to the roadwork is greater than the threshold value or the vehicle is determined to be not approaching the roadwork based on the direction of travel relative to the roadwork, the processor is configured to maintain functions of the autonomous cruise control.

3. The driver assistance system according to claim 1, wherein the processor is configured to provide a warning before at least one of disabling of the autonomous cruise control and re-enabling the autonomous cruise control, the warning comprising at least one of an audible warning and a visual warning.

4. The driver assistance system according to claim 1, wherein disabling of the autonomous cruise control is performed gradually over a predetermined time period.

5. The driver assistance system according to claim 1, comprising a works data transmitter configured to transmit data related to a location of a suspected roadwork.

6. The driver assistance system according to claim 5, wherein when the processor determines the presence of a suspected roadwork based on the ego-vehicle sensor data but not indicated by the works data, the processor is configured to cause the works data transmitter to transmit the vehicle position and an indication of the suspected roadwork to a remote receiver.

7. The driver assistance system according to claim 1, wherein when the processor determines the presence of a suspected roadwork based on the ego-vehicle sensor data but not indicated by the works data, the processor is configured to disable the autonomous cruise control until the processor determines an end of the suspected roadwork based on the ego-vehicle sensor data.

8. A method for driver assistance, comprising:
obtaining position data indicative of the vehicle's position;
obtaining ego-vehicle sensor data of objects in proximity to the vehicle;
receiving works data regarding current roadworks in proximity to the vehicle via at least one of 3G or 4G wireless communication, and C2C;
determining, based on the ego-vehicle sensor data, the works data, and the position data, the vehicle's position and direction of travel relative to one or more roadworks; and
when the vehicle is approaching a roadwork of the one or more roadworks and the vehicle proximity to the roadwork is less than a threshold distance, or when the vehicle is already present within one of the one or more roadworks and the autonomous cruise control is enabled, disabling the autonomous cruise control; and
determining, based on the ego-vehicle sensor data, the works data, and the position data, when the vehicle is exiting the roadwork; and
when the vehicle is exiting the roadwork, re-enabling the autonomous cruise control.

9. The method for driver assistance according to claim 8, comprising, wherein when the vehicle proximity to the roadwork is greater than the threshold value or the vehicle is determined as not approaching the roadwork based on the direction of travel relative to the roadwork, maintaining the autonomous cruise control.

10. The method for driver assistance according to claim 8, comprising providing a warning before at least one of disabling of the autonomous cruise control and re-enabling the autonomous cruise control, the warning comprising at least one of an audible warning and a visual warning.

11. The method for driver assistance according to claim 8, wherein disabling of the autonomous cruise control is performed gradually over a predetermined time period.

12. The method for driver assistance according to claim 8, comprising:
determining, based solely on the ego-vehicle sensor data, a suspected roadwork; and
transmitting the vehicle position and an indication of the suspected roadwork to a remote receiver.

13. The method for driver assistance according to claim 12, comprising, when the vehicle is approaching or within the suspected roadwork, disabling the autonomous cruise control until an end of the suspected roadwork has been determined.

14. A driver assistance system for a vehicle, comprising:
an autonomous cruise control configured to autonomously control at least a vehicle speed;
position data obtaining module configured to obtain position data indicative of the vehicle's position;
ego-vehicle sensor data obtaining device configured to obtain ego-vehicle sensor data related to objects in proximity to the vehicle;
works data receiver configured to receive works data regarding current roadworks within a predetermined distance of the vehicle; and
a processor configured to:
determine, based on the ego-vehicle sensor data, the works data, and the position data, the vehicle's position and direction of travel relative to one or more roadworks; and
when the processor determines that the vehicle is approaching a roadwork of the one or more roadworks and that the vehicle distance to the roadwork is less than a threshold distance, or when the processor determines that the vehicle is already present within a roadwork and the autonomous cruise control is enabled, disable the autonomous cruise control; and the processor is configured to provide a warning before at least one of disabling of the autonomous cruise control and re-enabling the autonomous cruise control, the warning comprising at least one of an audible warning and a visual warning.

\* \* \* \* \*